United States Patent [19]

Kalyanaraman et al.

[11] Patent Number: 5,139,837

[45] Date of Patent: Aug. 18, 1992

[54] OPTICAL INFORMATION MEDIUM EXHIBITING SHARP THRESHOLD FOR MARKING AND EXCELLENT CNR

[75] Inventors: Palaiyur S. Kalyanaraman, Fanwood; Harris A. Goldberg, Colonia; Frank J. Onorato, Phillipsburg, all of N.J.

[73] Assignee: Hoechst Celanese Corp., Somerville, N.J.

[21] Appl. No.: 491,804

[22] Filed: Mar. 8, 1990

[51] Int. Cl.$^5$ ................................. B32B 3/02
[52] U.S. Cl. ................................. 428/64; 428/65; 428/913; 428/333; 430/945; 369/288; 346/76 L; 346/135.1
[58] Field of Search .................. 428/64, 65, 913; 430/945; 369/288; 346/76 L

[56] References Cited

U.S. PATENT DOCUMENTS 3,700,487 10/1972 Crandon et al. .................. 428/412
4,859,569 8/1989 Hirose et al. .................. 430/945

Primary Examiner—B. Hamilton Hess
Assistant Examiner—Elizabeth Evans
Attorney, Agent, or Firm—P. S. Kalyanaraman

[57] ABSTRACT

Provided is an optical information medium comprised of an organic information layer and a resinous continuous film overcoat layer which is coated over said organic information layer. The resinous overcoat layer is no thicker than, and most preferably thinner than said information layer, and is of a thickness of about 100 angstroms or less. It is most preferred that the overcoat layer is comprised of a water soluble polymer. The resulting optical information medium advantageously exhibits an extremely sharp threshold for marking, as well as improved carrier to noise ratio.

10 Claims, 1 Drawing Sheet

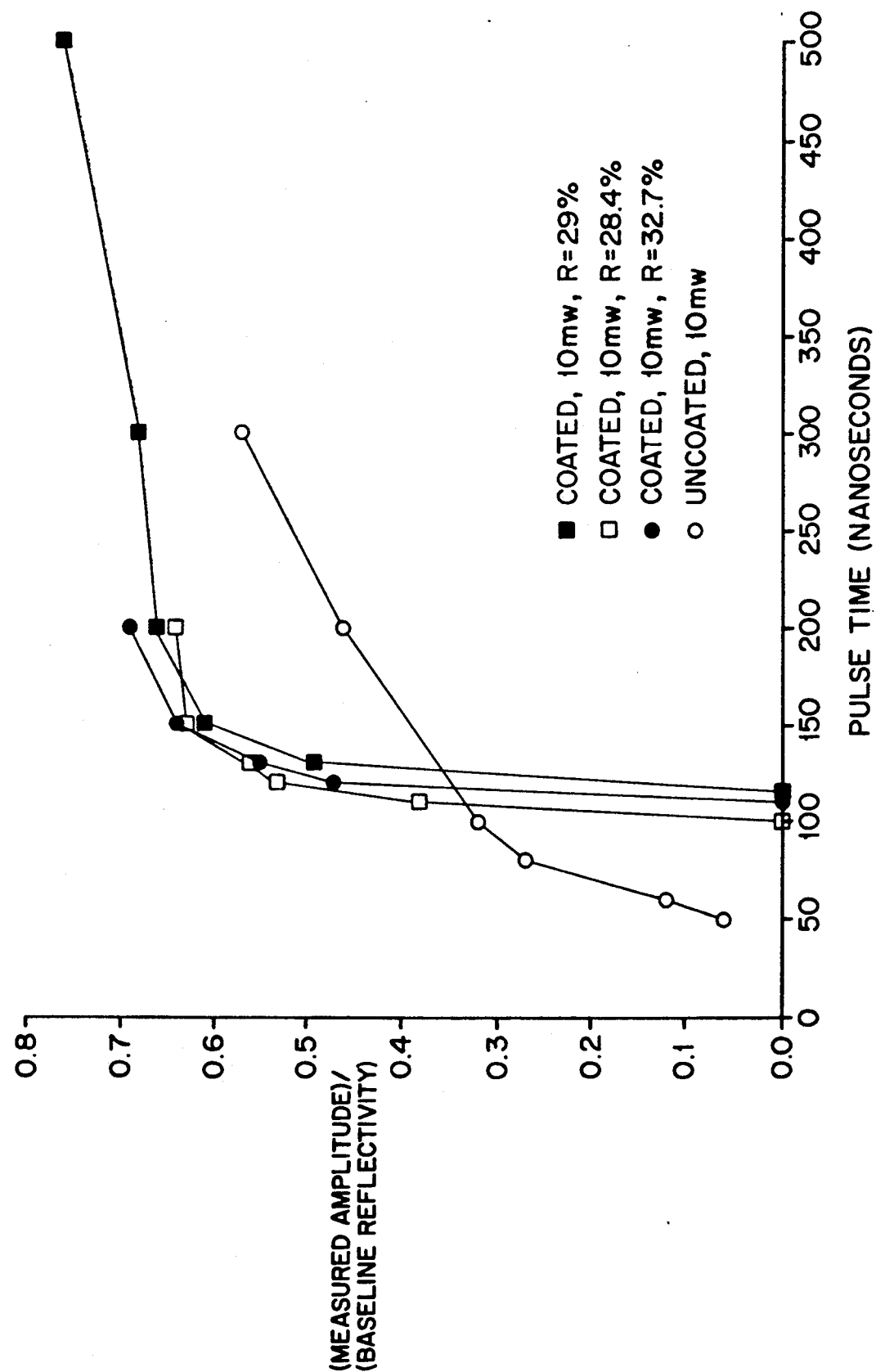

OPTICAL INFORMATION MEDIUM EXHIBITING SHARP THRESHOLD FOR MARKING AND EXCELLENT CNR

BACKGROUND OF THE INVENTION

The present invention relates to an optical information medium having an organic information layer. More specifically, the present invention relates to an optical information medium with an overcoat layer coated over the organic information layer.

The use of overcoat layers is well known in the optical information media art. Such layers are employed for many different purposes, e.g., as a thermal or mechanical barrier.

For example, in U.S. Pat. No. 4,069,487, there is disclosed a recording member for recording a laser beam bearing information by the deformation of a recording layer. The recording member is comprised of a support, the recording layer and an overcoat protecting layer which is not destroyed by the laser beam. The overcoat protecting layer can be an organic material or an inorganic material. Among the organic materials mentioned are organic high polymers such as nitrocellulose resins, polyvinyl chloride resins, polycarbonate resins and acrylic resins. The thickness of the protecting layer is generally in the range of from 0.1 to 10 microns.

In U.S. Pat. No. 4,584,259 there is disclosed an optical recording medium having an acrylic overcoat. The overcoating structure employed is somewhat complex, as it comprises a "soft pad" layer on the absorber, with a "hard" layer (e.g., a radiation cured acrylic) laid over the soft pad as an outer protective overcoat.

U.S. Pat. No. 4,340,655 discloses optical recording elements having a thermal and mechanical barrier layer coated over the recording layer. The thermal and mechanical barrier layer comprises water soluble polymers having a glass transition temperature when dry of at least 100° C., and preferably at least 150° C. The barrier layer coated over the information layer is generally of a thickness on the order of 1,500 angstroms or more. Such a thickness is believed needed to avoid rupturing during the recording process. See also, U.S. Pat. No. 4,101,907 which discloses an optical recording medium comprised of a light absorbing material which is coated with a transparent barrier layer and overcoated with a relatively thick transparent protective layer.

U.S. Pat. No. 4,527,173 discloses an erasable, reusable optical recording element having a heat-deformable recording layer overcoated with a transparent layer. The transparent overcoat has a thickness of between 0.05 microns up to 0.1 microns. The transparent overcoat is preferably made from a ceramic material, including aluminum oxide, silicon monooxide, silicon dioxide glass, silica, quartz and magnesium fluoride.

U.S. Pat. No. 4,636,804 pertains to a recording medium comprising a microporous polymer recording layer which is coated with a polymeric coating. The polymeric molecules of the coating are of sufficient molecular size or branching to preclude entry of the polymer molecules into the pores of the microporous polymer recording layer. Due to the polymeric coating employed over the microporous polymer recording layer, the recording medium exhibits an enhanced signal to noise ratio upon the reading of the recorded information.

The search for more effective and useful optical media is continuously ongoing. Any discoveries relating to improvements in the sensitivity, marking ability and noise reduction of optical media would be of a great benefit to the art.

Accordingly, it is an objective of the present invention to provide a novel, effective and useful optical information medium containing an organic information layer.

It is another object of the present invention to provide such an optical information medium which exhibits a sharper threshold in the marking of information in the recording layer.

Yet another object of the present invention is to provide such an optical information medium which exhibits improved carrier to noise ratio.

It is still another object of the present invention to provide a novel information medium having a specific overcoat layer coated over an organic information layer.

These and other objects of the present invention will become apparent upon a review of the following specification and the claims appended thereto.

SUMMARY OF THE INVENTION

In accordance with the foregoing objectives, there is provided by the present invention an optical information medium comprised of (i) an organic information layer which is a smooth, light absorptive layer in which changes can be induced and detected by using a laser focused upon the surface of the information layer, and (ii) a resinous continuous film overcoat layer which is coated over said organic information layer and is no thicker than said information layer, wherein the overcoat layer does not adversely react with the information layer, and said overcoat layer has a thickness which is about 1,000 angstroms or less.

In a most preferred embodiment, the resinous continuous film overcoat layer is comprised of a water soluble polymer, such as a polyvinyl alcohol, and the organic information layer is comprised of an aza-annulene chromophore, and particularly a naphthalocyanine.

In another embodiment of the present invention, there is provided a method of recording optical information in an organic information layer of an optical information medium by irradiating the information layer with a laser beam in accordance with said information to thereby form deformations in the information layer, the improvement which comprises said information layer being overcoated with a resinous continuous film overcoat layer which is no thicker than said information layer, said overcoat layer not adversely reacting with the information layer, and with said overcoat layer having a thickness which is about 1,000 angstroms or less.

BRIEF DESCRIPTION OF THE DRAWING

The Figure of the Drawing is a graphic representation of the sharp threshold observed in marking power when a coating of the present invention is employed.

DETAILED DESCRIPTION OF THE PREFERRED EMBODIMENTS

The optical information medium of the present invention comprises an organic information layer and a resinous continuous film overcoat layer which is coated over said organic information layer. It has been surprisingly found that when the overcoat layer of the present invention is employed, improved carrier to noise ratio is observed, as well as a surprising sharpness in the threshold power for marking the information layer. As a result, above the threshold power for marking, one clearly marks the information layer, whereas below the threshold power for marking, no marking occurs. This surprising advantage permits one to record information confidently and under excellent control.

The organic information layer of the optical information medium of the present invention is a smooth, light absorptive layer in which changes can be induced and detected by using a laser focused upon the surface thereof. Any such organic information layer can be employed in the practice of the present invention. It is preferred, however, that the information layer comprise an aza-annulene chromophore. Such chromophores include naphthalocyanines, phthalocyanines, anthracyanines, phenanthracyanines and porphyrins. Such compounds may be substituted or unsubstituted, with the substitutions being useful to affect the solubility properties of the compounds as well as the spectral properties. The most preferred chromophore for use in the organic information layer, however, is the naphthalocyanine chromophore, and most preferably the silicon naphthalocyanine chromophore.

Among the most preferred naphthalocyanine chromophores useful in the present invention are the naphthalocyanine chromophores of the following formula, containing the substituents as defined below:

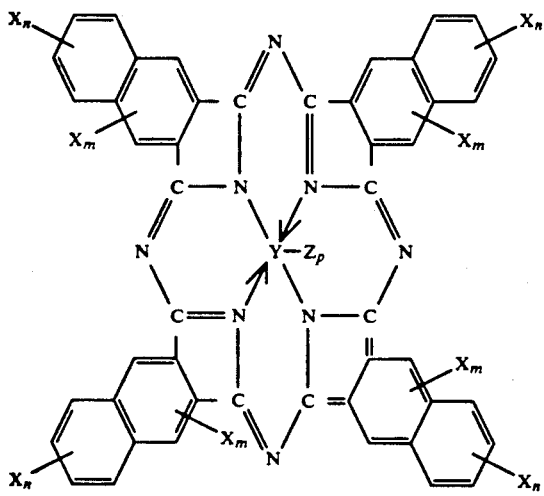

wherein

Y is Si, Ge, Sn, Al, Ga, In or a transition metal, more preferably Si or Ge, and most preferably Si;

Z is halogen, hydroxy, $OR_1$ or $OSiR_2R_3R_4$, wherein $R_1$ is an alkyl having at least four carbons; aryl having at least 6 carbons; acyl having at least 4 carbons; cycloalkyl having at least four carbons; or a polyether, and wherein $R_2$, $R_3$ and $R_4$ can be the same or different and are alkyl having from 1 to about 18 carbons; aryl having from 6 10 carbons; cycloalkyl having at least 4 carbons; siloxy; or alkoxy having at least 3 carbons;

with p representing the number of Z substituents and being either 0, 1 or 2, more preferably 1 or 2, and most preferably 2; and wherein the X substituents can be the same or different and are independently selected from halogen; alkyl having at least 4 carbons; aryl having from 6 to 10 carbons; acyl having at least 4 carbons; $NR_5R_6$; $NO_2$; $OR_7$; $SO_3-$; or $SO_2NR_5R_6$, with $R_5$ and $R_6$ being the same or different and being H; alkyl having from one to about 18 carbons; cycloalkyl having at least 4 carbons; aryl having from 6 to 10 carbons; or with $R_5$ and $R_6$ being taken together to form a heterocyclic ring containing the N atom and containing from 4 to 7 members, and wherein the X substituent is attached to the aromatic ring through the N atom when the substituent is $NR_5R_6$, $R_7$ is the same as $R_1$ defined above, and with n and m indicating the number of independently selected X substituents, each n being the same or different and ranging from 0 to 4, and each m being the same or different and ranging from 0 to 2.

In the foregoing naphthalocyanine chromophores, when p is a value such that all of the valences of the central atom are not occupied with Z substituents, any other valence or valences of the central atom can be occupied by any conventional single valence substituent, e.g., hydrogen, halide or hydroxy.

It is preferred that there be at least one Z substituent in the naphthalocyanine chromophores of the present invention. Both types of substituents, however, X and Z, may be present. As well, two different Z substituents can be present.

The foregoing naphthalocyanine chromophores are uniquely suited for use in the recording layers of optical recording media, and are therefore preferred for such an application. These chromophores exhibit excellent chemical and photolytic stability, thereby rendering the chromophores extremely useful in the information layer of an optical recording medium. As well, the chromophores can exhibit unique spectral and solubility characteristics. These characteristics render the manipulation of the chromophore quite easy. Their excellent solubility characteristics can also be important if a polymer is to be used with the chromophore in formulating an information layer. As the chromophore becomes more compatible with the polymer, higher loading is achievable and the chance of phase separation is diminished. Solubility in the same solvent as the polymer used in the recording layer, if a polymer is desired to be used, also permits one to achieve higher loading of the chromophore in the recording layer, as well as to cast the chromophore/polymer using conventional techniques.

The foregoing naphthalocyanine chromophores of the present invention can also exhibit surprising film-forming properties, depending upon the substituents chosen, thereby allowing one the option of simply casting the chromophore without the need for a polymer. One is thereby able to realize the benefits of the thermomechanical properties of a film-forming material without the need for a polymer. This, in combination with the other unique characteristics of these chromophores renders the formulation of an information layer therefrom quite an easy task. As well, since the use of a polymer can be avoided, if desired, the problem of chromophore/polymer separation can be avoided.

The most referred film-forming naphthalocyanine chromophores for use in the present invention are those chromophores within the aforedescribed general formula when p is 1 or 2, and Z is $(OSiR_8R_9)_k R_{10}$, with $R_8$ and $R_9$ being the same or different and being an alkyl having from 1 to about 18 carbon atoms, and preferably from 1 to about 4 carbon atoms, or an aryl having from 6 to about 12 carbon atoms;

k is at least 1 and is preferably from 1 to about 50, and when p is 2, k may be different for each Z group; and, with $R_{10}$ being a functionalized alkoxy; a functionalized alkoxy being defined as an alkoxy group containing additional functional units, i.e., functions containing atoms other than or in addition to C and H, with amide, ester, ether and alcohol functions being preferred additional functional units. More than one and/or a mixture of such additional functional units can be employed in the alkoxy group. The amide and/or the ether functions are the most preferred additional functional units. It is also most preferred that Y is Si in the foregoing naphthalocyanine chromophores.

Examples of preferred functionalized alkoxy groups ($R_{10}$) which can be employed include the following:

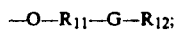
$-O-R_{11}-G-R_{12}$;

$-O-R_{11}-G-R_{13}-O-R_{14}$;

and

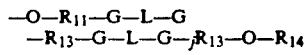
$-O-R_{11}-G-L-G-R_{13}-G-L-G-]_j R_{13}-O-R_{14}$ wherein $R_{11}$ is a divalent hydrocarbon radical in which the carbon atom attached to the oxygen is aliphatic, suitable examples being ethylene, propylene or phenethylene;

$R_{12}$ is alkyl, preferably having from one to eighteen carbon atoms, or aryl, preferably having from six to twelve carbon atoms;

$R_{13}$ is a divalent hydrocarbon radical;

$R_{14}$ is $R_{12}$ or H;

j is zero or greater, and preferably ranges from 0 to about 100;

G is a divalent radical containing atoms in addition to or in place of C and H, and preferably contains an ether, ester or amide function; and L is a divalent linking group such as a phenylene, diphenyl ether or polymethylene group, with 1,4-phenylene and 1,3-phenylene being among the preferred phenylene linking groups.

In the foregoing definitions, the alkyl groups can include branched and cyclic structures, as well as straight-chain structures.

Within the aforesaid parameters, preferred naphthalocyanine chromophores useful in the practice of the present invention include the following specific compounds:

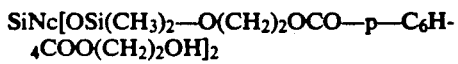
$SiNc[OSi(CH_3)_2-O(CH_2)_2OCO-p-C_6H_4COO(CH_2)_2OH]_2$

$SiNc[OSi(CH_3)_2-O(CH_2)_6NHCOCH(CH_3)_2]_2$ $SiNc[OSi(CH_3)_2-O(CH_2)_6NHCOC(CH_3)_3]_2$

$SiNc[OSi(CH_3)_2-O(CH_2)_6NHCO(CH_2)_{14}CH_3]$

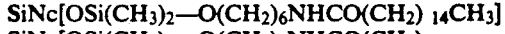
$SiNc[OSi(CH_3)_2-O(CH_2)_3NHCO(CH_2)_8CONH(CH_2)_3OH]_2$

$SiNc[OSi(CH_3)_2-O(CHCH_3CH_2O)_3CH_3]_2$, and

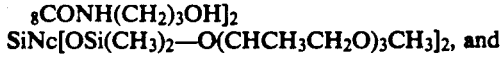
$SiNc[OSi(CH_3)_2-O(CH_2)_3NHCO-p-C_6H_4CONH(CH_2)_3OH]_2$.

As a general consideration in the selection of the $R_8$, $R_9$ and $R_{10}$ moieties employed in the Z substituents of the foregoing preferred film-forming naphthalocyanine chromophores, their structures are generally dictated by the requirement of processability. For example, to obtain a desired level of solubility in the solvents of the present invention, it is undesirable for all of the R moieties to have the minimum number of carbon atoms discussed above. On the other hand, two of the moieties may have the minimum number, provided the third has a sufficient number of carbon atoms, or other characteristics, to result in the desired solubility.

While the foregoing preferred film-forming naphthalocyanine chromophores are characterized by their unique Z substitution off of the central atom, substitution off of the naphthalene rings can also be desirable. As discussed briefly above, such ring substituents can be employed to alter the absorption maximum of the chromophore molecule. Examples of such substituents include sulfonamide, alkyl, aryl, ether, sulfonate, salts, halogen, amine, nitro and acyl substituents. Preferably, the number and type of the ring substituents are selected so as to result in an absorption maximum for the chromophore which corresponds to the output wavelength of the laser to be used in the optical recording.

The organic information layer of the present invention is coated with a resinous continuous film overcoat layer. This layer can be any suitable resinous material which forms a smooth continuous film and does not react adversely with the information layer. It is important for the realization of the advantages of the present invention that this overcoat layer be no thicker than, and most preferably thinner than the information layer, and have a thickness which is about 1,000 angstroms or less. While the maximum thickness is about 1,000 angstroms for the overcoat layer, the minimum thickness can be any thickness as long as a continuous film coating is still achieved over the organic information layer. Preferably, the thickness of the resinous overcoat layer is in the range of from about 200 to about 1,000 angstroms, and most preferably in the range of from about 250 to about 750 angstroms.

The most preferred materials for use as a resinous continuous film overcoat layer are water soluble polymers, and particularly those which are spin-coatable and film-forming. A most preferred polymer for use in the present invention is a polyvinyl alcohol. Most preferably, the polyvinyl alcohol has a weight average molecular weight of over 100,000, and most preferably about 125,000 molecular weight or greater. This provides the polyvinyl alcohol with good film forming properties. Many such suitable polyvinyl alcohols are commercially available.

In a most preferred embodiment, the polyvinyl alcohol used is hydrolyzed to such an extent that the polyvinyl alcohol is substantially only water soluble, i.e., the polyvinyl alcohol exhibits substantially no solubility in organic solvents. Preferably, the polyvinyl alcohol is at least 65% hydrolyzed, and most preferably at least 75% hydrolyzed.

Both the organic information layer and the resinous overcoat layer can be cast from solution. The coatings can be effected using a wide variety of techniques. Useful methods include spray coating, air knife coating, whirl coating, doctor-blade coating, and most preferably spin coating. The organic information layer can be cast from a suitable organic or alcohol solvent, while the overcoat layer is generally cast from an aqueous solution, particularly when the resin material is a water soluble polymer. While the aqueous solution used in casting a water soluble polymer such as polyvinyl alcohol can be primarily water, mixtures of water with other solvents can also be used provided the amount and nature of the other solvent is such that the information layer remains unaffected. An example of such a suitable mixture is a 90:10 volume mixture of water/isopropanol.

Depending upon the desired mode of reading the optical information medium of the present invention, the substrate for the element is either reflective or transparent. The substrate which is coated should also possess a surface of suitable smoothness. This may be imparted by appropriate molding or other forming techniques when the substrate is made. If the substrate has an inadequately smooth surface, a smoothing or subbing layer may be used to attain the appropriate smoothness. Such smoothing or subbing layer should not, of course, interfere with the application or utilization of the information layer which is subsequently applied thereto. A subbing layer can contain preformatting information. The substrate itself may be optionally featureless or may contain preformatting information (e.g., tracking groove and/or encoded information in the form of readable marks).

The material of which the substrate is comprised is generally a material exhibiting good mechanical strength and good structural integrity against warping. Examples of suitable materials include aluminum, glass, reinforced glass, ceramics, polymethacrylates, polyacrylates, polycarbonates, phenolic resins, epoxy resins, polyesters, polyimides, polyethersulfones, polyetherketones, polyolefins, polyphenylenesulfide and nylon. Polycarbonate and polymethylmethacrylate are preferred materials for use as a substrate. Furthermore, the shape and size of the substrate, and hence the recording medium, can vary depending on the application. The shape and format, for example, may be a disk, tape, belt or drum. A disk shape or tape format is most preferred.

Additional layers as is known in the art may also be employed in the optical information medium of the present invention. For example, a suitable protective layer or cover can be used to protect the medium from dirt, dust, scratches or abrasion.

The following examples are provided in order to further illustrate the present invention and the advantages thereof. The examples are in no way meant to be limitative, but merely illustrative.

EXAMPLE 1

Four polycarbonate substrates were coated with a subbing layer and different silicon naphthalocyanine chromophore containing information layers. Three of the prepared samples were then top coated with a polyvinyl alcohol continuous film overcoat layer. This overcoat layer was spin coated onto the information layer using a 2 weight % polyvinyl alcohol solution in water. The average molecular weight of the polyvinyl alcohol was 125,000. After coating, the samples were baked in an oven at 75° C. for 2¼ hours.

The coated samples were then marked using a 10 milliwatt power laser using various pulse widths of laser exposure. The results of the marking experiments are graphically depicted in the Figure of the Drawing.

As can be seen from the Figure of the Drawing, for the three samples which utilize the overcoat layer of the present invention, an extremely sharp threshold of marking was observed. Marking could occur at a pulse time of 120 nanoseconds, but not at 100 nanoseconds. To the contrary, when the silicon naphthalocyanine information layer was not overcoated, some marking occurred over a much wider range of exposures.

This very sharp threshold is advantageous as it enhances the performance and utility of the disk. The marking of the disk can be controlled better and the marking of the disk can be much sharper. The disk also exhibits excellent environmental stability.

EXAMPLE 2

Twenty polycarbonate substrates were coated with a silicon naphthalocyanine information layer. The thicknesses of the information layers varied from sample to sample. Fifteen of the samples were then overcoated with a polyvinyl alcohol overcoat layer, with a thickness of the overcoat layer also varying from sample to sample. The procedure used for coating the polyvinyl alcohol overcoat layer followed along the lines of that discussed in Example 1.

The transmittance and reflectance of each of the samples were measured at 811 nm. As well, the carrier to noise ratio for each of the samples was measured. The results of the measurements are provided in the table below.

TABLE

| Sample | % T (811 nm) | Dye Thickness (Å) | PVA Thickness (Å) | % R Air Side (811 nm) | CNR (8 mw) (5.65 mls 2.5 mHz) |
|---|---|---|---|---|---|
| 1 | 0.6 | 1763 | 0 | 36 | 37 |
| 2 | 0.5 | 1804 | 500 | 24.6 | 46 |
| 3 | 0.6 | 1763 | 750 | 17.3 | 40 |
| 4 | 0.6 | 1763 | 1600 | 26.4 | 38 |
| 5 | 6.6 | 915 | 0 | 41.8 | 44 |
| 6 | 6.6 | 912 | 250 | 35.3 | 50 |
| 7 | 6.6 | 918 | 730 | 21.8 | 50 |
| 8 | 6.8 | 906 | 1800 | 37.6 | 29 |
| 9 | 9.7 | 758 | 0 | 41.5 | 47 |
| 10 | 9.2 | 780 | 250 | 37.0 | 51 |
| 11 | 9.4 | 771 | 750 | 21.7 | 52 |
| 12 | 9.2 | 780 | 1950 | 39.1 | 30 |
| 13 | 13.4 | 626 | 0 | 43.5 | 51 |
| 14 | 13.7 | 617 | 250 | 37.7 | 52 |
| 15 | 13.8 | 614 | 800 | 21.4 | 39 |
| 16 | 13.6 | 620 | 1900 | 37.5 | 38 |
| 17 | 2.0 | 1393 | 0 | 34.8 | 38 |
| 18 | 2.0 | 1393 | 500 | 29.3 | 44 |
| 19 | 2.1 | 1375 | 750 | 19.2 | 46 |
| 20 | 1.9 | 1411 | 1600 | 33.6 | 40 |

From the data in the table, it can be seen that excellent carrier to noise ratio was observed for those samples where the thickness of the polyvinyl alcohol overcoat layer was less than 1,000 angstroms and was of a thickness less than that of the information layer. As noted in Sample 15, for example, even though the thickness of the overcoat layer was less than 1,000 angstroms, a poor carrier to noise ratio was observed because its thickness was greater than that of the information layer. Thus, it is important that the thickness of the overcoat layer be less than about 1,000 angstroms and no thicker than, and most preferably less than that of the information layer in order to realize the advantages of the present invention.

While the invention has been described with preferred embodiments, it is to be understood that variations and modifications are to be considered within the purview and the scope of the claims appended hereto.

What is claimed is:

1. An optical information medium comprised of
   (i) an organic information layer which is a smooth, light absorptive layer in which changes can be induced and detected by using a laser focused upon the surface of the information layer, and
   (ii) a resinous continuous film overcoat layer which is coated over said organic information layer and which is no thicker than said information layer, wherein the overcoat layer does not adversely react with the information layer, and with said overcoat layer having a thickness which is about 1,000 angstroms or less,
wherein said resinous overcoat layer is comprised of a water soluble polymer, and wherein the organic information layer is comprised of a silicon naphthalocyanine chromophore.

2. The optical information medium of claim 1, wherein the organic information layer is comprised of a silicon naphthalocyanine substitute at the central silicon atom with a siloxy substituent.

3. An optical information medium comprised of
   (i) an organic information layer which is a smooth, light absorptive layer in which changes can be induced and detected by using a laser focused upon the surface of the information layer, and
   (ii) a resinous continuous film overcoat layer which is coated over said organic information layer and which is no thicker than said information layer, wherein the overcoat layer does not adversely react with the information layer, and with said overcoat layer having a thickness which is about 1,000 angstroms or less,
wherein said resinous overcoat layer has a thickness in the range of about 200 to about 1,000 angstroms, and is comprised of polyvinyl alcohol.

4. The optical information medium of claim 3, wherein the polyvinyl alcohol is at least 65% hydrolyzed.

5. The optical information medium of claim 3, wherein the polyvinyl alcohol is at least 75% hydrolyzed.

6. An optical information medium comprised of
   (i) an information layer comprised of a naphthalocyanine chromophore which is a smooth, light absorptive layer in which changes can be induced and detected by using a laser focused upon the surface of the information layer, and
   (ii) a polyvinyl alcohol continuous film overcoat layer which is coated over said naphthalocyanine containing information layer and which is no thicker than said information layer, with said overcoat layer having a thickness in the range of from about 200 to about 1,000 angstroms, wherein the naphthalocyanine chromophore is comprised of a silicon naphthalocyanine.

7. The optical information medium of claim 6, wherein the polyvinyl alcohol of the overcoat layer is at least 75% hydrolyzed.

8. The optical information medium of claim 6, wherein the overcoat layer is of a thickness in the range of from about 250 to about 750 angstroms.

9. The optical information medium of claim 6, wherein the polyvinyl alcohol overcoat layer is a spin coated layer.

10. A method of recording optical information in an organic information layer of an optical information medium by irradiating the information layer with a laser beam in accordance with said information to thereby form deformations in the information layer, the improvement which comprises said information layer being overcoated with a resinous continuous film overcoat layer which is no thicker than said information layer, said overcoat layer not adversely reacting with the information layer, and with said overcoat layer having a thickness which is about 1,000 angstroms or less, whereby said overcoat layer cooperates with said information layer to sharpen the threshold of marking of said information medium.

* * * * *